3,703,583
ANTICALCULUS FORMULATIONS
Donald J. Martin, Fair Lawn, N.J., assignor to Lever
Brothers Company, New York, N.Y.
No Drawing. Continuation of abandoned application Ser.
No. 700,007, Jan. 24, 1968. This application June 10,
1971, Ser. No. 151,954
Int. Cl. A61k 7/16
U.S. Cl. 424—54                           1 Claim

ABSTRACT OF THE DISCLOSURE

Dental formulations, such as tooth paste, tooth powder, and mouth wash, containing anticalculus agents selected from the group consisting of N-methyl-N-dodecyl-N-(2-hydroxyethyl) - N - benzyl ammonium chloride, N-methyl-N-(2-hydroxydodecyl) - N - (2-hydroxyethyl)-N-benzyl ammonium chloride, N-methyl-N-(2-hydroxytetradecyl)-N-(2-hydroxyethyl - N - benzyl ammonium chloride, and di-isobutylphenoxy-ethoxy-ethyldimethyl-benzyl ammonium chloride, are disclosed.

---

This application is a continuation of Ser. No. 700,007, filed Jan. 24, 1968, now abandoned.

The instant invention is directed to chemical anticalculus agents and to formulations for the prevention or reduction of salivary calculus.

Dental calculus is a hard, mineralized formation which forms on the teeth. Generally, regular brushing of the teeth is employed to prevent the rapid development of calculus deposits. However, it is well known that even with regular and thorough brushing, calculus deposits form and adhere tenaciously to the teeth. Such deposits must be removed mechanically by a dentist.

It is generally believed that calculus results from the mineralization of dental plaque. Plaque is believed to be a material composed largely of microorganisms and an organic matrix which is probably derived from bacteria and saliva. Dental experts generally believe that calculus, also known as tartar, is dental plaque which has crystallized with the development of a hydroxy apatite structure having an identifiable crystal structure. It will be apparent therefore that the incidence of dental calculus can be reduced by means which reduce or prevent the deposition of plaque and by means which prevent crystallization of the plaque.

It is an object of this invention to provide therapeutic formulations for the treatment and prevention of salivary calculus.

A further object of the invention is to provide novel dental formulations containing active ingredients which prevent or diminish the development of salivary calculus.

Another object of the invention is to provide compositions which prevent or diminish the deposition of dental plaque.

Another object of the invention is to provide dental compositions which reduce the mineralization of dental plaque to a hydroxy apatite crystal structure normally associated with dental calculus.

These and other related objects are achieved by the hereafter described dental formulations which comprise, in addition to the various conventional ingredients well known in the art of dental therapeutics, certain quaternary ammonium compounds selected from the group consisting of N-methyl-N-dodecyl-N-(2-hydroxyethyl)-N-benzyl ammonium chloride, N-methyl-N-(2-hydroxydodecyl)-N-(2-hydroxyethyl)-N-benzyl ammonium chloride, N-methyl - N - (2-hydroxytetradecyl) - N - (2-hydroxyethyl)-N-benzyl ammonium chloride, and di-isobutylphenoxy-ethoxy-ethyldimethyl-benzyl ammonium chloride.

These quaternary ammonium compounds have been shown to possess significant degree of anticalculus activity by several testing procedures. Since the mechanism of calculus formation is complex and has not been precisely established, the mode of action of various anticalculus agents cannot be generically explained. The apparent effect of a particular agent may vary from test to test. However, the effectiveness of each of the above-mentioned materials has been established by one or more procedures.

These compounds can be incorporated conveniently into various dental formulations, such as tooth pastes, tooth powders, mouth washes, and gargles, the balance of the dental formulation being conventional ingredients, such as abrasives, germicides, coloring agents, flavoring agents, astringent compounds, and the like.

In preparing dental formulations in accordance with this invention, the active anticalculus ingredient is incorporated in the formulation in an inhibiting amount, i.e., an amount which is sufficient to prevent or diminish the development of calculus. Broadly, suitable formulations comprise from about 0.005 weight percent to about 2 weight percent of the anticalculus agent in combination with some physiologically acceptable and innocuous carrier formulation.

For example, mouth wash formulations can comprise from about 2.0 to about 40.0 percent ethyl alcohol, from about 0.02 to about 0.45 percent boric acid, from about 0.02 to about 2.0 percent of a flavoring agent, up to about 1 percent of a nonionic surface active agent, e.g., an ethoxylated fatty alcohol, up to about 50 percent glycerin, from about 0.0005 to about 0.5 percent of a quaternary ammonium compound effective as an anticalculus agent, up to about 0.01 percent of a dye, up to about 1.0 percent of a one molar sodium hydroxide solution, and the balance to 100 percent, by weight, distilled water. Table 1 below sets forth an illustrative formulation and a preferred range of compositions.

TABLE 1

| Ingredients | Percent | Range, percent |
|---|---|---|
| Ethyl alcohol, U.S.P. 95% V/V | 15.000 | 5–25 |
| Boric acid | 0.1547 | 0.05–0.26 |
| Flavor | 0.1650 | 0.05–0.20 |
| Polyethoxylated stearyl alcohol [1] | 0.1000 | 0–0.2 |
| Glycerin | 5.0000 | 0–20 |
| N-methyl-N-(2-hydroxydodecyl)-N-(2-hydroxyethyl)-N-benzyl ammonium chloride | 0.0200 | 0.01–0.10 |
| Dyes | 0.0003 | 0–0.001 |
| Sodium hydroxide, 1M solution | 0.1500 | 0–0.2 |
| Distilled H₂O, to | 100 | |
| | 100.0000 | |

[1] BRIJ 78—20 moles of ethylene oxide per mole of fatty alcohol.

Suitable tooth paste formulations comprise an abrasive material, such as silica, a binder, such as hydroxyethyl cellulose, glycerin, flavoring and sweetening agents, water, and from about 0.02 to about 2.0 weight percent of the anticalculus agent herein described.

Table 2 below sets forth broad and preferred ranges of illustrative ingredients.

TABLE 2

| Ingredients | Percent by weight | |
|---|---|---|
| | Broad range | Preferred range |
| Abrasive silica | 5-40 | 8-17 |
| Silica (non-abrasive) | 0.5-20 | 2-15 |
| Hydroxyethyl cellulose | 0.5-30 | 0.5-5.0 |
| Titanium dioxide | 0-20 | 0.1-5.0 |
| N-methyl-N-(2-hydroxyethyl)-N-(2-hydroxydodecyl)-N-benzyl ammonium chloride | 0.02-2.0 | 0.04-1.0 |
| Glycerin | 5-70 | |
| Polyethylene glycol "400" | 0-20 | |
| Flavoring agent | 0.1-5 | |
| Sweetening agent (saccharin) | 0.01-0.5 | 0.02-0.3 |
| Water | 4-60 | |

A particularly preferred tooth paste formulation comprises about 15 weight percent abrasive silica, about 8 weight percent non-abrasive silica, about 0.85 weight percent hydroxyethyl cellulose, about 0.5 weight percent titanium dioxide, about 0.25 weight percent N-methyl-N-(2-hydroxyethyl)-N-(2-hydroxydodecyl) - N - benzyl ammonium chloride, about 33 weight percent glycerine, about 4 weight percent polyethylene glycol, about 30 weight percent water and the balance, to 100 percent, inert ingredients which do not affect the nature of the composition, e.g., dyes, impurities, sweetening and flavoring agents.

Illustrative tooth powders comprise from about 0 to about 99 weight percent insoluble sodium metaphosphate, from about 0 to about 99 weight percent dicalcium phosphate, from about 0.2 to about 2.0 weight percent of anticalculus agent such as N-methyl-N-(2-hydroxyethyl)-N-(2-hydroxydodecyl)-N-benzyl ammonium chloride, and from about 0.1 to about 5 weight percent of a flavoring agent.

Oral dental preparations, such as tooth paste and tooth powders, typically contain dental abrasives and other additives. It will be appreciated that the dental abrasive, as well as other adjuvants, should be a material which is compatible with the anticalculus agent employed or a material which can be made compatible therewith through the use of suitable additives or solubilizers.

Typical abrasive ingredients which may be used include the insoluble phosphate salts, such as calcium pyrophosphate, dicalcium phosphate, and other water-insoluble materials such as calcium carbonate (chalk), finely divided silica, and finely divided resinous materials such as polyethylene.

Oral dental formulations, particularly powders and pastes, may contain surface active compounds. The anticalculus agents herein disclosed can be combined with many detergents and foaming agents, preferably of the well-known class of nonionic surface active agents.

The term "nonionic" refers to surface active compounds in which the small highly ionized group characteristic of ionic type surface active agents has been replaced by a long chain containing a series of weakly hydrophilic groups such as ether linkages or hydroxyl groups.

Illustrative surface active compounds include compounds of the general formula $Z(C_2H_4O)_nH$, wherein $n$ is a whole number from about 6 to about 30 and Z is a hydrophobic base selected from the group consisting of: (1) alkoxy groups containing from about 12 to about 20 carbon atoms, (2) alkylphenoxy groups in which the alkyl portion contains from about 8 to about 12 carbon atoms, and (3) acyloxy groups containing from about 6 to about 30 carbon atoms.

Other suitable detergents include alkylene oxide condensates, particularly propylene oxide-ethylene oxide condensates represented by the formula:

$$HO(C_2H_4O)_a(C_3H_6O)_b(C_2H_4O)_cH$$

in which $b$ is a polyoxypropylene base of molecular weight of about 800 to about 1000 and $(a+c)$ amounts to about 50 percent to 80 percent by weight ethylene oxide, based on the total molecular weight of the condensate molecule.

Other suitable detergents include condensates of ethylene oxide and long chain diols containing from about 8 to about 22 carbon atoms. The condensate can contain up to 23 molecules of ethylene oxide per molecule of long chain diol. These surface active compounds are more fully described in copending application Ser. No. 332,159.

Another group of suitable detergents include polyolethers, polyolpolyethers, and thioether analogs of the generic structure

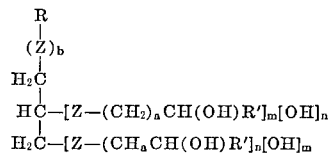

wherein R is an aliphatic hydrocarbon group of from about 5 to about 12 carbon atoms; each Z is oxygen, sulfur, or a sulfoxide group; $a$ is 1 or 2; $b$ is 0 or 1; $m$ is 0 or 1; $n$ is 0 or 1, and R' is hydrogen, methyl or a hydroxy methylene group ($CH_2OH$) with the proviso that $m+n$ equal 1. These surface active compounds are more completely described in copending application Ser. No. 502,299.

In the formulation of tooth pastes, a binder or vehicle adapted to form a suitable paste will be used. Such binders generally are based on a combination comprising water, glycerin, and a bodying agent, such as a carbohydrate gum, polyethylene glycol, sodium carboxy cellulose, or hydroxyethyl cellulose. Nonionic bodying agents are preferred.

The ability of the herein disclosed quaternary ammonium compounds to inhibit or retard calculus was evaluated by an in vitro test in which glass plummets were repeatedly dipped into a calculogenic medium, e.g., human saliva, or a preparation containing an extract of porcine submaxillary gland. The basic dipping test has been described by Leung in an article entitled "A New Method for the In Vitro Production of Artificial Calculus," J. Periodontology, vol. 28, page 217, 1957. This test can be considered as a screening procedure giving an empirical evaluation of anticalculus activity. It involves repeatedly immersing a substrate, such as a tooth or a glass plummet, into a calculogenic medium which is conducive to the deposition of dental plaque and the conversion of the plaque to calculus. During immersion, the substrate is wetted with the medium. When the substrate is removed from the medium, the medium becomes partly dried on the substrate. After a test period of from three to five days a plaque-like deposit is generally visible on the substrate. This deposit then gradually crystallizes to form the hydroxy apatite structure associated with dental calculus.

By treating the substrate with an anticalculus agent and comparing the nature and extent of the deposit formed on the treated substrates with deposits formed on a control or untreated substrate, the degree of anticalculus activity can be determined. Suitable treatment of the substrate with the anticalculus agent can be achieved by dipping, spraying, or brushing the substrate with the agent to be tested. The amount of deposit formed on the substrate provides a visual comparison of the effectiveness of one agent as compared to other agents or a control.

As an adjunct to the visual evaluation of the amount of deposit, the deposited material is scraped from the substrate and examined by X-ray diffraction techniques to determine whether or not the anticalculus agent has been effective in preventing mineralization and development of the hydroxyapatite structure characteristic of dental calculus.

Table 3 below shows the results obtained in the above-described test.

TABLE 3

| Agent tested | Concentration, percent | Visual rating [1] | X-ray |
|---|---|---|---|
| N-methyl-N-(2-hydroxydodecyl)-N-(2-hydroxyethyl)-N-benzyl ammonium chloride. | 0.25 | 2.0 | Amorphous. |
| Di-isobutyl-phenoxyethoxy-ethyl-dimethyl-benzyl ammonium choride. | 0.25 | 4.0 | Hydroxyapatite—strong. |
| Control | 0.0 | 3.0 | |

[1] Scale for visual rating: 0=no visible deposit; 1=very light deposit; 2=light deposit; 3=medium deposit (control); 4=heavy deposit.

Table 4 shows the results obtained in tests conducted on rats in which the accumulation of calculus on molar teeth was evaluated. The calculus which develops in such rats is similar to human calculus with respect to its X-ray pattern, degree of mineralization, calcium to phosphate ratios, and crystal impurities. This test was conducted by topically applying the anticalculus agent to the molar teeth of rats on a daily basis (5 days) over a six-week period. At the termination of the test, the teeth were empirically evaluated for calculus accumulation on a blind basis. The activity of the anticalculus agent is expressed as a percent reduction in the amount of calculus present, based on a control.

TABLE 4

| Test material | Concentration, percent | Reduction, percent |
|---|---|---|
| N-methyl-N-(2-hydroxydodecyl)-N-(2-hydroxyethyl)-N-benzyl ammonium chloride | 0.25 | 40.9 |
| N-methyl-N-dodecyl-N-(2-hydroxyethyl)-N-benzyl ammonium chloride | 0.25 | 23.6 |
| Di-isobutyl-phenoxy-ethoxy-ethyl-dimethyl-benzyl ammonium chloride | 0.25 | 42.4 |
| N-methyl-N-(2-hydroxyethyl)-N-(2-hydroxytetradecyl)-N-benzyl ammonium chloride | 0.25 | 24.5 |

I claim:

1. A method for inhibiting the formation of dental calculus which comprises oral application of a calculus inhibiting amount of N-methyl-N-(2-hydroxyethyl)-N-(2-hydroxydodecyl)-N-benzyl ammonium chloride.

References Cited

UNITED STATES PATENTS 3,369,046    2/1968    Kaniecki et al. _____ 424—54

RICHARD L. HUFF, Primary Examiner